United States Patent
Homchaudhuri et al.

(10) Patent No.: US 10,375,638 B1
(45) Date of Patent: Aug. 6, 2019

(54) DETECTION OF LEAKY AND ROGUE ACCESS POINTS

(71) Applicant: QUALCOMM Incorporated, San Diego, CA (US)

(72) Inventors: Sandip Homchaudhuri, San Jose, CA (US); Pradeep Kumar Yenganti, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/956,683

(22) Filed: Apr. 18, 2018

(51) Int. Cl.
 *H04W 52/02* (2009.01)
 *H04B 7/06* (2006.01)
 *H04B 7/0413* (2017.01)

(52) U.S. Cl.
 CPC ...... *H04W 52/0229* (2013.01); *H04B 7/0693* (2013.01); *H04W 52/0251* (2013.01); *H04B 7/0413* (2013.01)

(58) Field of Classification Search
 CPC ...................... H04W 52/0251; H04W 52/0229
 See application file for complete search history.

(56) References Cited

U.S. PATENT DOCUMENTS

| | | | |
|---|---|---|---|
| 2005/0192054 A1* | 9/2005 | Asada | H04W 52/0229 455/558 |
| 2015/0079986 A1* | 3/2015 | Nayak | H04W 52/0229 455/435.2 |

* cited by examiner

*Primary Examiner* — Gbemileke J Onamuti

(57) ABSTRACT

Certain aspects relate to methods, apparatuses, computer readable mediums and access terminals that effectively (1) detect leaky or rogue access points and (2) take one or more actions based on such detection.

19 Claims, 10 Drawing Sheets

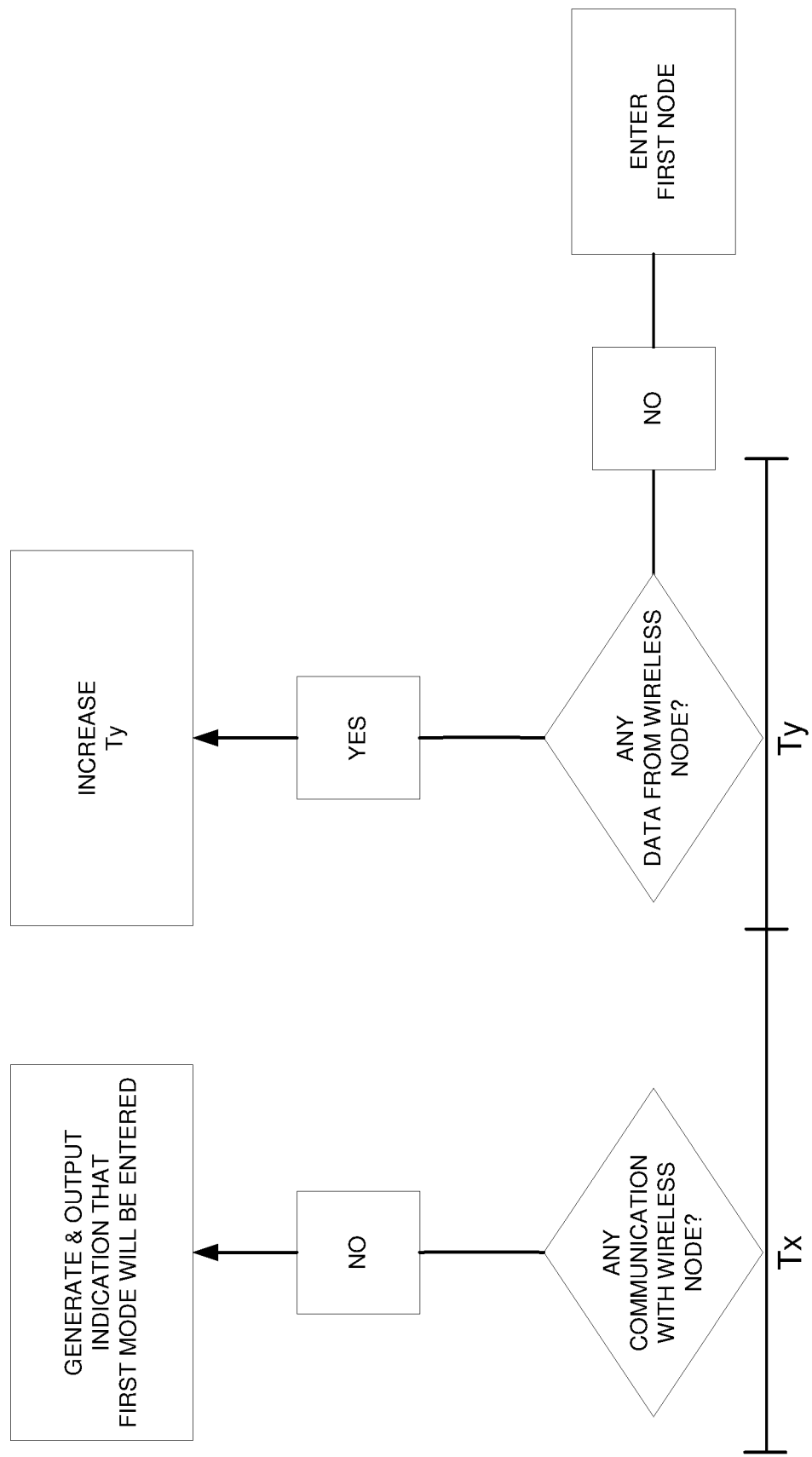

DETECTION OF LEAKY AND ROGUE ACCESS POINTS

BACKGROUND

Field

The present disclosure generally relates to communications networks, and more particularly, to methods and apparatuses directed to detection of leaky access points.

Background

Wireless communications networks are widely deployed to provide various communications services such as telephony, video, data, messaging, broadcasts, and so on. Such networks, which are usually multiple access networks, support communications for multiple users by sharing the available network resources.

These wireless communications networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks and Wi-Fi networks.

Within such wireless communications networks, a variety of data services may be provided, including voice, video, and emails. More recently, wireless communications networks are being used for an even broader range of services and larger numbers of users. As the demand for mobile broadband access continues to increase, research and development continue to advance wireless communications technologies not only to meet the growing demand for mobile broadband access, but to advance and enhance the user experience.

BRIEF SUMMARY

The systems, networks, methods, devices and apparatuses of the disclosure each have several aspects. No single one of the aspects is solely responsible for desirable attributes of such systems, networks, methods, devices and apparatuses. Without limiting the scope of this disclosure as expressed by the claims which follow, some aspects will now be discussed briefly. After considering this discussion, and particularly after reading the section entitled "Detailed Description" one will understand how the aspects of this disclosure provide advantages associated with how to detect leaky rouge wireless nodes such as access points.

Certain aspects provide an apparatus for wireless communications. The apparatus generally includes (a) a processing system configured to (a) define a first time period for determining whether the apparatus is communicating with a wireless node and a second time period being associated with entering a first mode, wherein the second time period starts when the first time period ends, (b) determine whether the apparatus is communicating with the wireless node during the first time period and (c) generate an indication that the apparatus will enter the first mode if the determination indicates the apparatus is not communicating with the wireless node during the first time period. The apparatus also includes an interface that is configured to output the indication for transmission to the wireless node at the end of the first time period if the determination indicates the apparatus is not communicating with the wireless node during the first time period. Furthermore, the processing system is also configured to (i) determine whether the apparatus has obtained any data from the wireless node during the second time period, (ii) increase the second time period if the determination indicates the apparatus has obtained data from the wireless node during the second time period and (iii) cause the apparatus to enter the first mode at the end of the second time period if the determination indicates the apparatus has not obtained any data from the wireless node during the second time period.

Certain aspects provide an apparatus for wireless communications. The apparatus generally includes a processing system configured to generate an indication that the apparatus will enter the first mode during which the apparatus is configured for communications via a subset of a set of antennas and an interface configured to (a) output the indication for transmission to a wireless node and (b) obtain a data packet from the wireless node after outputting the indication. Furthermore, the processing system is further configured to (a) determine a first result or a second result based on the obtained data packet, (b) if the determination yields the first result, (i) communicate with the wireless node via the set of antennas or (ii) refrain from entering the first mode and (c) if the determination yields the second result, cause the apparatus to enter or re-enter the first mode.

Aspects generally include methods, apparatuses, computer readable mediums and wireless nodes such as access terminals, as substantially described herein with reference to and as illustrated by the accompanying drawings. Numerous other aspects are provided.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates one or more aspects regarding when an apparatus should generate an indication that it will enter a first mode such as a sleep mode or a power save and when it should enter such first mode.

To facilitate understanding, identical reference numerals have been used, where possible, to designate identical elements that are common to the figures. It is contemplated that elements disclosed in one aspect may be beneficially used on other aspects without specific recitation.

DETAILED DESCRIPTION

Figure 1:
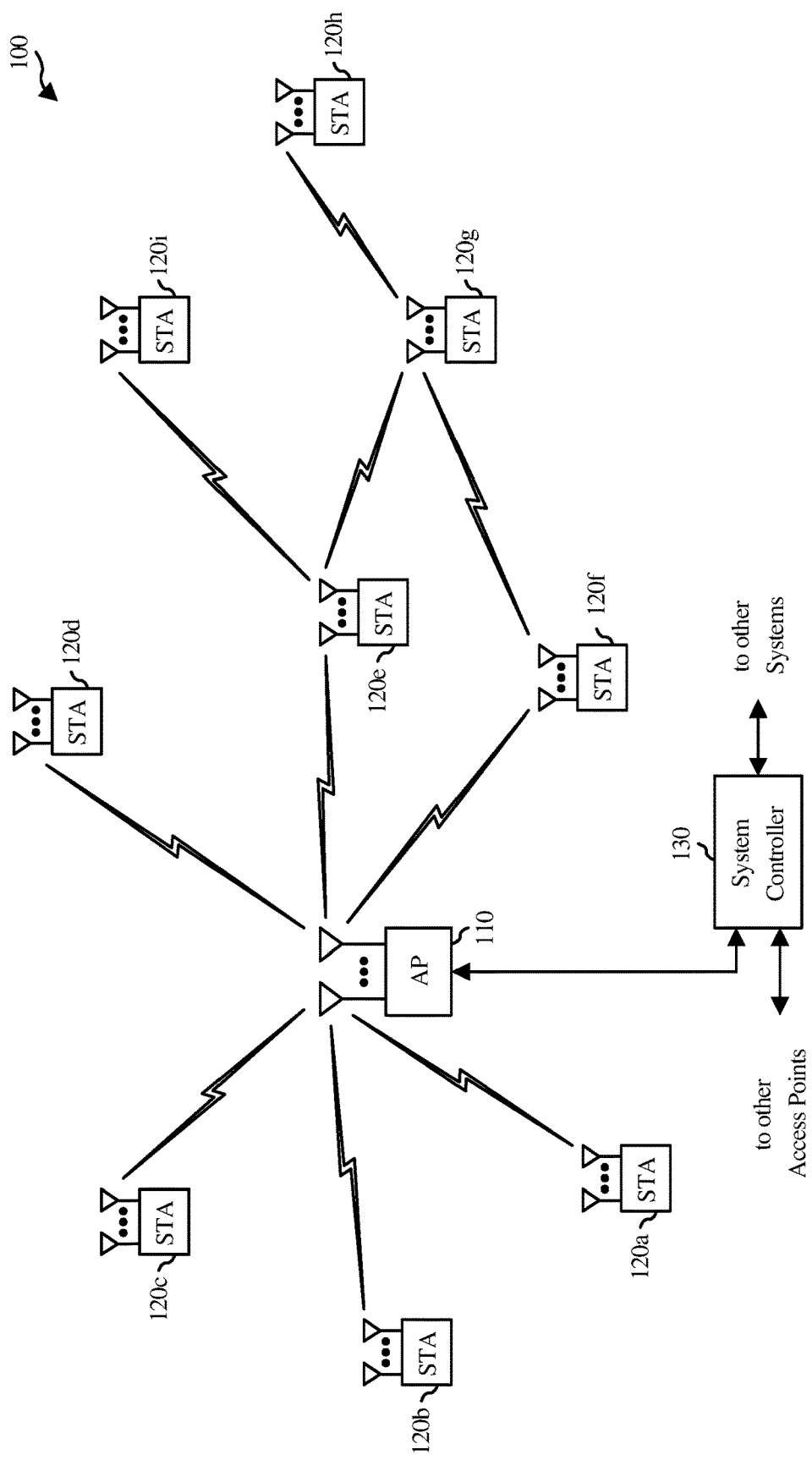
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The word "communicate" is used herein to mean "transmit", "receive", "transmit and receive", "output" something for transmission or "obtain" something. The word "communication" or "communications" is used herein to mean "transmission", "reception", "transmission and reception", "outputting" or "obtaining".

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof The following description is directed to certain implementations for the purposes of describing the innovative aspects of this disclosure. However, a person having ordinary skill in the art will readily recognize that the teachings herein can be applied in different ways and may be incorporated into various types of communication networks or network components. In some aspects, the teachings herein may be employed in a multiple-access network capable of supporting communication with multiple users by sharing the available network resources (e.g., by specifying one or more of bandwidth, transmit power, coding, interleaving, and so on). For example, the teachings herein may be applied to any one or combinations of the following technologies or standards: Code Division Multiple Access (CDMA), Multiple-Carrier CDMA (MCCDMA), Wideband CDMA (W-CDMA), Time Division Multiple Access (TDMA), Frequency Division Multiple Access (FDMA), Single-Carrier FDMA (SC-FDMA), Orthogonal Frequency Division Multiple Access (OFDMA), IS-95, cdma2000, IS-856, W-CDMA, TDSCDMA, 802.11 (Wi-Fi), 802.16, Global System for Mobile Communication (GSM), Evolved UTRA (E-UTRA), IEEE 802.20, Flash-OFDM®, Long Term Evolution (LTE), Ultra-Mobile Broadband (UMB), Ultra-Wide Band (UWB), Bluetooth®, GSM/General Packet Radio Service (GPRS), Enhanced Data GSM Environment (EDGE), Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), AMPS, or other technology of 3G, 4G, or 5G.

The techniques may be incorporated into (such as implemented within or performed by) a variety of wired or wireless apparatuses (such as nodes or devices). In some implementations, a node includes a wireless node. Such a wireless node may provide, for example, connectivity to or for a network [such as a wide area network (WAN) such as the Internet or a cellular network] via a wired or wireless communications link. In some implementations, a wireless node may be an access point or a user terminal.

Example of Wireless Communications Network

FIG. 1 illustrates a multiple-access Multiple Input Multiple Output (MIMO) network 100 with access points and user terminals. For simplicity, only one access point 110 is shown in FIG. 1. An access point (AP) is generally a fixed station that communicates with the user terminals and also may be referred to as a base station or some other terminology. A user terminal may be fixed or mobile and also may be referred to as a mobile station, an access terminal (AT), a station (STA), a client, user equipment or some other terminology. A user terminal may be a cellular phone, a personal digital assistant (PDA), a handheld device, a wireless modem, a laptop computer, a personal computer, etc.

The access point 110 may communicate with one or more user terminals or stations 120 at any given moment on the downlink and uplink. The downlink (i.e., forward link) is the communications link from the access point to the user terminals, and the uplink (i.e., reverse link) is the communications link from the user terminals to the access point. A user terminal also may communicate peer-to-peer with another user terminal. A network controller 130 couples to and provides coordination and control for the access points.

The MIMO network 100 employs multiple transmit and multiple receive antennas for data transmission on the downlink and uplink. The access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In some implementations, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and receives user-specific data from the access point. In general, each selected user terminal may be equipped with one or multiple antennas (i.e., $N_{ut} \geq 1$). The $N_u$ selected user terminals can have the same or different number of antennas.

The MIMO system or network 100 may be a time division duplex (TDD) network or a frequency division duplex (FDD) network. For a TDD network, the downlink and uplink share the same frequency band. For an FDD network, the downlink and uplink use different frequency bands. The MIMO network 100 also may use a single carrier or multiple carriers for transmission. Each user terminal may be equipped with a single antenna (such as in order to keep costs down) or multiple antennas (such as where the additional cost can be supported). The MIMO network 100 may represent a high speed Wireless Local Area Network (WLAN) operating in a 60 GHz band.

Figure 2:
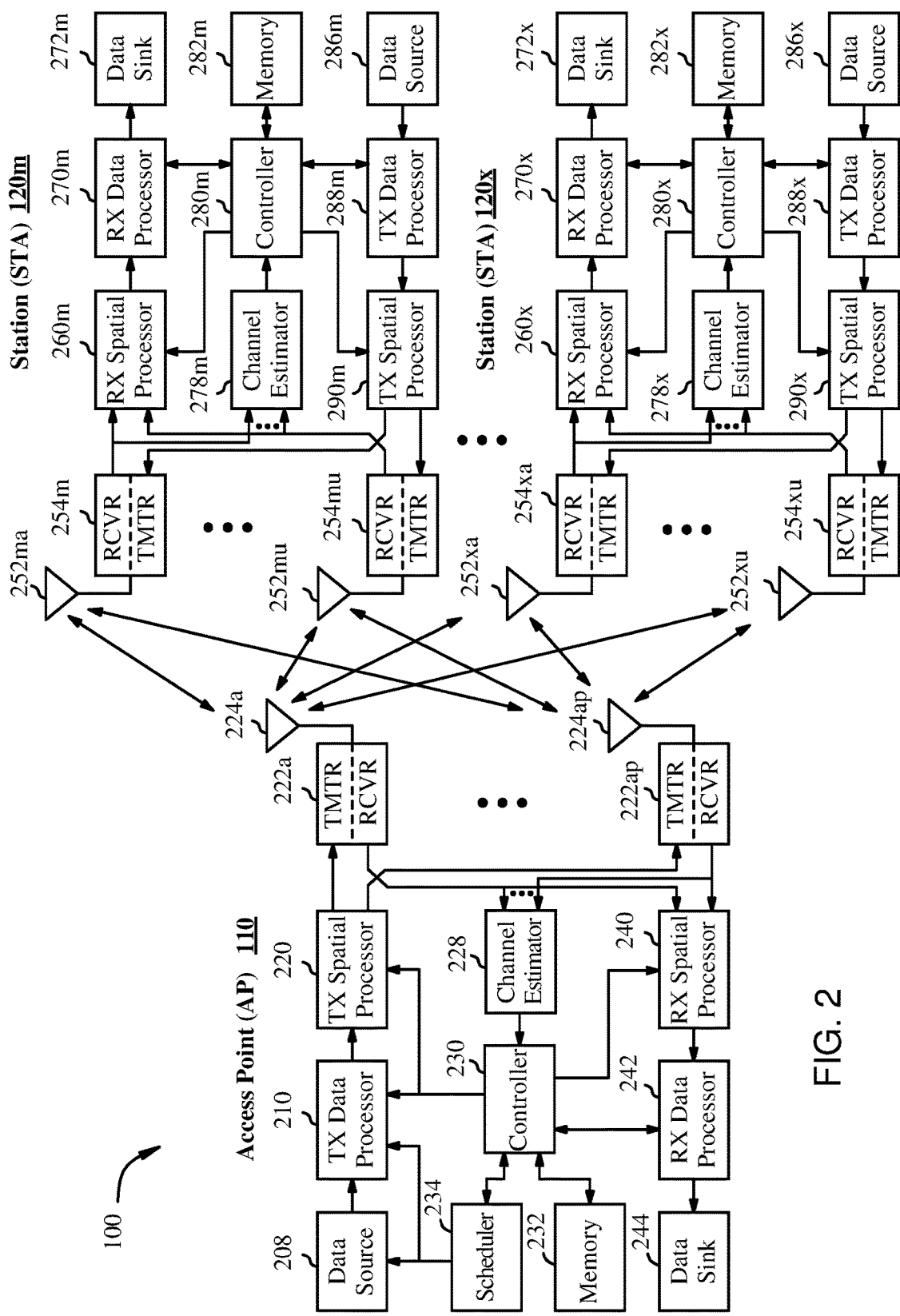
FIG. 2 is a block diagram of an example access point and example stations, in accordance with certain aspects of the present disclosure.

FIG. 2 illustrates example components of the access point 110 and user terminal or station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 5, 5A, 7, and 7A.

FIG. 2 shows a block diagram of the access point/base station 110 and two user terminals 120m and 120x in a MIMO network 100. The access point 110 is equipped with $N_{ap}$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. Moreover, $N_{up}$ may or may not be equal to $N_{dn}$, and $N_{up}$, and $N_{dn}$ may include static values or can change for each scheduling interval. Beamforming (such as beam-steering) or some other spatial processing techniques may be used at the access point and user terminal.

On the uplink, at each user terminal 120 selected for uplink transmission, a TX data processor 288 receive traffic data from a data source 286 and control data from a controller 280. The controller 280 may be coupled with a memory 282. The TX data processor 288 processes (such as encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. The $N_{ut,m}$ transmitter units 254 provide $N_{ut,m}$ uplink signals for transmission from the $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At the access point 110, the $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by the transmitter unit 254 and provides a received symbol stream. An RX spatial processor 240 performs receiver spatial processing on the $N_{ap}$ received symbol streams from the $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (such as demodulates, de-interleaves, and decodes) each recovered uplink data symbol stream $\{s_{up,m}\}$ in accordance with the rate used for that stream to obtain decoded data. The decoded data for each user terminal may be provided to a data sink 244 for storage and a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. The TX data processor 210 processes (such as encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. The $N_{ap}$ transmitter units 222 provide $N_{ap}$ downlink signals for transmission from the $N_{ap}$ antennas 224 to the user terminals. The decoded data for each STA may be provided to a data sink 272 for storage and/or a controller 280 for further processing.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing can be performed in accordance with the CCMI, MMSE, or other known techniques. An RX data processor 270 processes (such as demodulates, de-interleaves, and decodes) the recovered downlink data symbol stream to obtain decoded data for the user terminal.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (such as demodulates, de-interleaves, and decodes) the recovered downlink data symbol stream to obtain decoded data for the user terminal.

Figure 3:
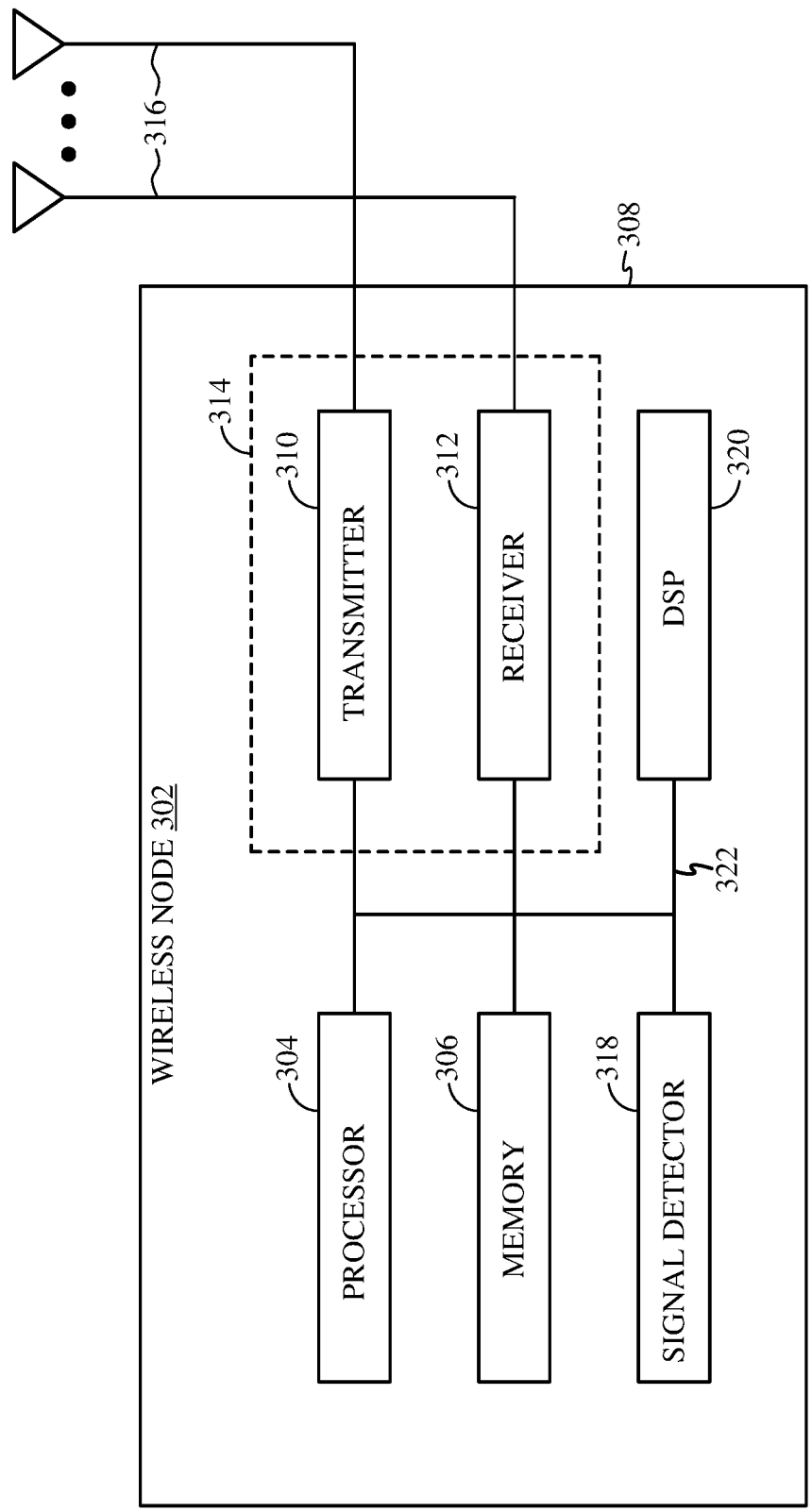
FIG. 3 illustrates an example wireless device, in accordance with certain aspects of the present disclosure.

FIG. 3 illustrates various components that may be used in a wireless device 302 that may be employed within the MIMO network 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 also may be referred to as a central processing unit (CPU). Memory 306, which may include both read-only memory (ROM) and random access memory (RAM), provides instructions and data to the processor 304. A portion of the memory 306 also may include non-volatile random access memory (NVRAM). The processor 304 typically performs logical and arithmetic operations based on program instructions stored within the memory 306. The instructions in the memory 306 may be executable to implement the methods described herein.

The wireless device 302 also may include a housing 308 that may include a transmitter 310 and a receiver 312 to allow transmission and reception of data between the wireless device 302 and a remote location. The transmitter 310 and the receiver 312 may be combined into a transceiver 314. A plurality of transmit antennas 316 may be attached to the housing 308 and electrically coupled to the transceiver 314. The wireless device 302 also may include (not shown) multiple transmitters, multiple receivers, and multiple transceivers.

The wireless device 302 also may include a signal detector 318 that may be used in an effort to detect and quantify the level of signals received by the transceiver 314. The signal detector 318 may detect such signals as total energy, energy per subcarrier per symbol, power spectral density and other signals. The wireless device 302 also may include a digital signal processor (DSP) 320 for use in processing signals.

The various components of the wireless device 302 may be coupled together by a bus system 322, which may include a power bus, a control signal bus, and a status signal bus in addition to a data bus.

At certain times the wireless device 302 might not have any data to transmit and if so, the wireless device 302 would enter a first mode during which less power will be used by the wireless device 302. Such first mode can be sleep mode or power save mode. During the first mode, certain components of the wireless device 302 are using less power or turned off. Accordingly, the wireless device 302 consumes less power and is not expected to obtain or receive any wireless transmission that includes data although it can still detect or detect and then even obtain or receive incoming wireless transmission such as a beacon that includes control information since its radio may periodically wake up, be active or periodically wake up and be active for other tasks such as scanning for any beacon that indicates whether an AP has any buffered data for the wireless device 302 or scanning for available APs for future communications therewith. Therefore, before entering sleep mode or power save mode, the wireless device 302, such as a station or access terminal (AT), will inform another wireless device such as an access point (AP) that the AT will enter the first mode by transmitting an indication that the AT will enter such first mode. However, the AP might not receive such indication or could receive such indication but then simply ignore the AT being operable in this new mode and thus still transmit data to the AT while the AT is in such first mode. In effect, the AP is not honoring the AT's request to operate in the first mode and thus this AP is "leaky" since the AP should have had buffered all the data for transmission to the AT while the AT is in the first mode but some of such data was transmitted or "leaked".

Furthermore, as illustrated in FIG. 3, the AT can have more than one antenna with each antenna being capable of receiving or transmitting one spatial stream. Assuming it has two antennas, it could use both antennas for WiFi communications, both antennas for cellular communications or one antenna for WiFi communications and the other antenna for cellular communications. If the AT is using both antennas for WiFi communications, it could then determine that it will need one of them for cellular communications and if so, the AT would then inform the AP by transmitting an indication that the AT will use only one of the two antennas for further communications with the AP. However, the AP might not receive such indication or could receive such indication but then simply ignore the AT being operable with just only one antenna and thus still transmit data to the AT via two spatial streams. Since the AT is only using one antenna for communication with the AP, the AT cannot receive data transmitted via two spatial streams. In effect, the AP is not honoring the AT's request to operate with just one antenna and thus, this AP is a "rogue" AP.

The behavior of leaky and rogue APs as described above have resulted in data stalls and lowered user experience.

The following examples of apparatuses, methods, computer readable mediums and access terminals effectively (1) detect leaky or rogue access points and (2) take one or more actions based on such detection.

Example of Detection of Leaky Ap

FIG. 4 illustrates one or more aspects regarding (1) when an apparatus such as a processing system or the wireless device 302 such as the AT should generate an indication that it will enter a first mode such as a sleep mode or a power save and (2) when it should enter such first mode. During a first time period $T_x$, if the AT does not have any data for transmission to the AP and has not received any data from the AP, the AT would generate an indication that it will enter the first mode. Immediately following the Tx, a second time period $T_y$ begins. During $T_y$, the AT determines whether it has received any data from the AP. If not, the AT would enter the first mode and if yes, the AT would increase $T_y$ to have more time for receiving any additional data from the AP before the AT enters the first mode at the end of such increased $T_y$.

Figure 5A:
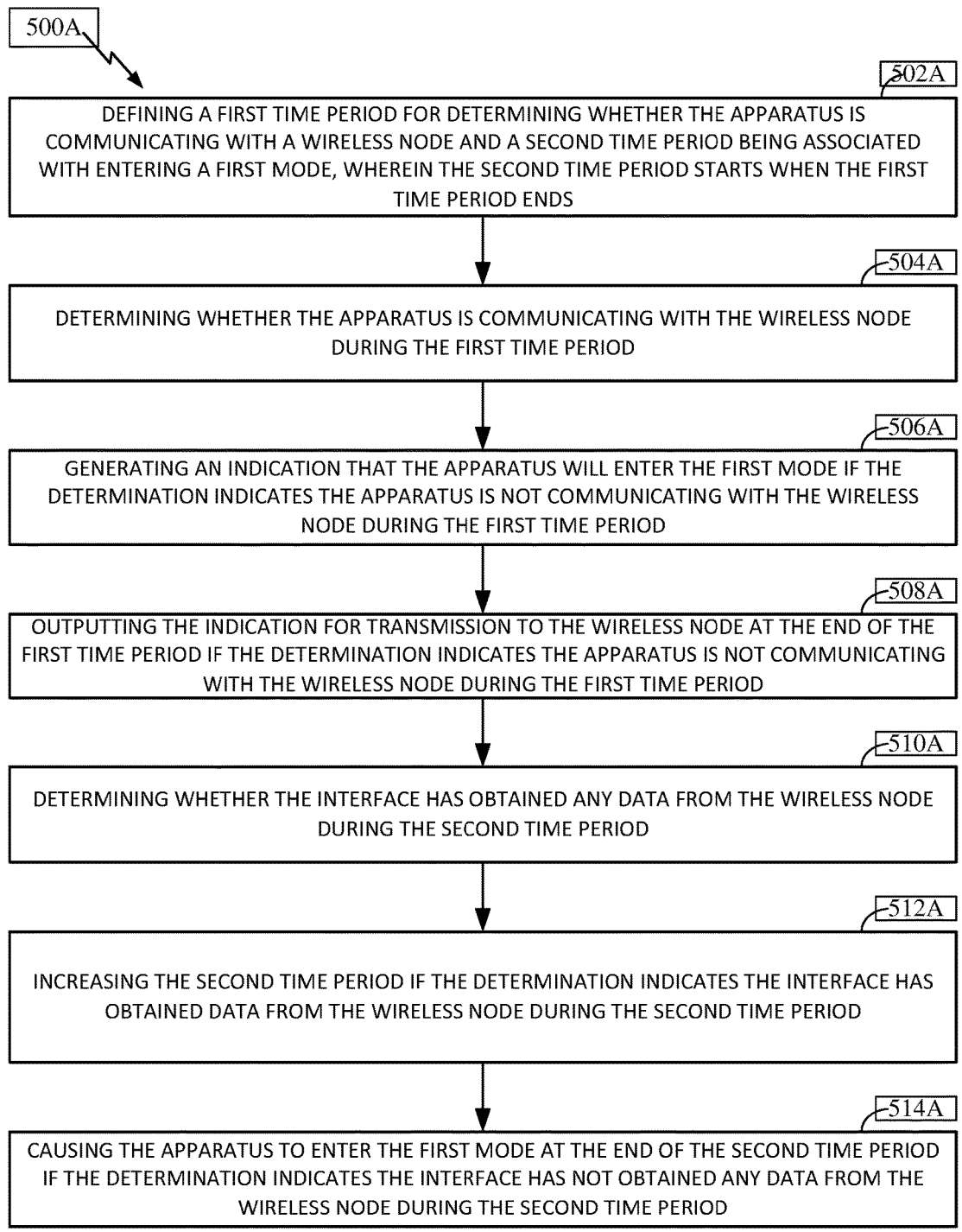
FIG. 5A is a flow diagram of example operations for wireless communications in accordance with one or more aspects of FIG. 4.

FIG. 5A a flow diagram of example operations 500A for wireless communications in accordance with one or more aspects of FIG. 4. The operations 500A may be performed by an apparatus or a wireless device 302 of FIG. 3. In certain aspects, the wireless device 302 is an access point or the STA 120m.

At block 502A, the apparatus defines a first time period such as $T_x$ of FIG. 4 for determining whether the apparatus is communicating with a wireless node and also defines a second time period such as $T_y$ of FIG. 4 being associated with entering a first mode. $T_y$ starts when $T_x$ ends with $T_x$ being 200 ms or less and $T_y$ being 20 ms or less. In certain aspects, $T_x$ is about 40 milliseconds (ms) and $T_y$ is 10 ms or less.

At block 504A, the apparatus determines whether the apparatus is communicating with the wireless node during $T_x$. In certain aspects, the apparatus determines (i) whether it has any data to be outputted for transmission to the wireless node, (ii) whether the apparatus has obtained any data from the wireless node or both (i) and (ii). If the apparatus is not communicating for a particular time period, it should save power by operating in a different mode that consumes less power. Thus, this determination per block 504A gets performed.

At block 506A, the apparatus generates an indication that the apparatus will enter the first mode if the determination per block 504A indicates the apparatus is not communicating with the wireless node during $T_x$. More specifically, before entering the first mode, the apparatus should inform the wireless node about its intention to operate in a different mode and to do so, the apparatus simply generates the indication of its intention to operate in the first mode at block 506A. When the apparatus is in the first mode, it consumes less power than its current mode of operation and thus it is not expected to obtain any data transmission from the wireless node. In one aspect, the first mode is a sleep mode during which the apparatus periodically wakes up and scans for any beacon indicating that there is data buffered at the wireless node for the apparatus and if so, the apparatus would wake up or exit the sleep mode. Although the apparatus can obtain the beacon during sleep mode, the apparatus cannot obtain or correctly obtain any data since the apparatus is operating in a mode that uses less power than when the apparatus is fully functional and is capable of receiving both data and control information such as the information in a beacon. In another aspect, the first mode is a power save mode during which the apparatus consumes less power than normal operation but can still obtain or receive data as well as control information because the apparatus is still active for other tasks such as scanning for other available wireless nodes or APs for future communication therewith.

At block 508A, the apparatus outputs the indication for transmission to the wireless node at the end of $T_x$ if the determination per block 504A indicates the apparatus is not communicating with the wireless node during $T_x$.

When $T_x$ ends and $T_y$ begins, the apparatus, at block 510A, determines whether the apparatus has obtained any data from the wireless node during $T_y$, which is the amount of time typically taken by the apparatus to transition from its current mode of operation to the first mode. This determination gets performed because the apparatus could obtain data from the wireless node during $T_y$ and if so, the apparatus would delay entering the first mode as further on discussed below.

At block 512A, the apparatus increases $T_y$ if the determination indicates the apparatus has obtained data from the wireless node during $T_y$. The increase of $T_y$ effectively delays the apparatus from entering the first mode during which the apparatus may not be able to obtain any wireless data, may just be able to detect incoming data packet without being able to obtain or receive the entire data packet or may only be able to obtain or receive control information. Such delay allows the apparatus to obtain any additional data being or to be transmitted from the wireless node to the apparatus. In certain aspects, the sum of $T_x$ and the increased $T_y$ is one second with $T_x$, for example, equaling 40 ms so that $T_y$ is long enough for the apparatus to obtain any additional data before entering the first mode. In other aspects, the sum of $T_x$ and the increased $T_y$ is four times the sum of the originally defined $T_x$ and $T_y$.

Alternatively, if the determination indicates the apparatus has not obtained any data from the wireless node during $T_y$, the apparatus, at block 514A, enters the first mode at the end of $T_y$.

In one aspect, after entering the first mode per block 514A, the apparatus then exits such first mode, obtains a data packet from the wireless node having a sequence number, determines a difference between the sequence number of the data packet and a sequence number of another data packet previously obtained by the apparatus prior to the indication of entering the first mode being generated and either increases $T_x$ for subsequent determination of whether the apparatus is communicating with the wireless node if the difference is greater than a threshold value or refrains from re-entering the first mode if the difference is greater than a threshold value. In other words, the apparatus compares the sequence numbers of the data packet obtained before entering the first mode and the data packet obtained after exiting the first mode. The difference will indicate whether the wireless node is leaky.

More specifically, the sequence number increases by the same amount between consecutive data packets. For example, assuming the apparatus obtains first, second and third packets in the order of transmission by the wireless node, the difference between the sequence numbers of the first and second packets is the same as the difference between the sequence numbers of the second and third packets. Due to previous communications with the wireless node, the apparatus knows such threshold value of the difference between sequence numbers of two consecutively data packets transmitted by the wireless node. Thus, if the difference between the sequence numbers of the data packet obtained before entering the first mode and the data packet obtained after exiting the first mode is greater than the threshold value, this indicates the wireless node is leaky because the value of such difference should be the same as the threshold value, not greater than the threshold value. Effectively, the apparatus did not obtain a "missing" data packet that was transmitted by the wireless node right after the transmission of the data packet obtained by the apparatus before entering the first mode. Thus, the wireless node is leaky because the wireless node must have transmitted such "missing" data packet while the apparatus was in the first mode such as sleep mode. Instead, the wireless node should have buffered such "missing" data packet based on the indication by the apparatus that the apparatus will enter the first mode.

Since the wireless node is leaky, the apparatus can refrain from entering the first mode because, otherwise, it could miss other data packets from the wireless node. Alternatively, the apparatus can increase $T_x$ for subsequent determination of whether the apparatus is communicating with the wireless node before the apparatus would enter the first mode. By increasing $T_x$, the apparatus will be more confident that the wireless node has no data for transmission to the apparatus before the apparatus enters the first mode.

In another aspect, the apparatus obtains a data packet from the wireless node while the apparatus is in the power save mode even though the apparatus had informed the wireless node that the apparatus will enter such power save mode. This detection indicates the wireless node is leaky and, in response, the apparatus can either refrain from entering the first mode again (re-entering the first mode) or increase $T_x$ for subsequent determination of whether the apparatus is communicating with the wireless before entering the first mode.

In certain aspects, the apparatus can test whether the wireless node such as the AP is leaky. More specifically, after being associated with the AP the apparatus generates a request for data from the AP and outputs such request for transmission before generating and outputting the indication of entering the first mode for transmission. After exiting the first mode, the apparatus should receive the requested data. In one aspect, the apparatus exits the first mode and then obtains data that is different from the requested data and this indicates the requested data was transmitted to the apparatus by the AP while the apparatus was in the first mode. Thus, the AP is leaky and the apparatus can further communicate with the AP by either increasing $T_x$ or refraining from re-entering the first mode. In another aspect, the apparatus exits the first mode and waits for a period of time for the requested data. If the apparatus obtains the requested data during such time period, this indicates the AP is honoring the apparatus's request to operate in the first mode during which the AP would buffer data destined for the apparatus. If the apparatus does not obtain or receive the requested data during such time period, this indicates AP might not be honoring the apparatus's request to operate in the first mode. Accordingly, at the end of such time period, the apparatus can further communicate with the AP by either increasing $T_x$ or refraining from re-entering the first mode.

Figure 5B:
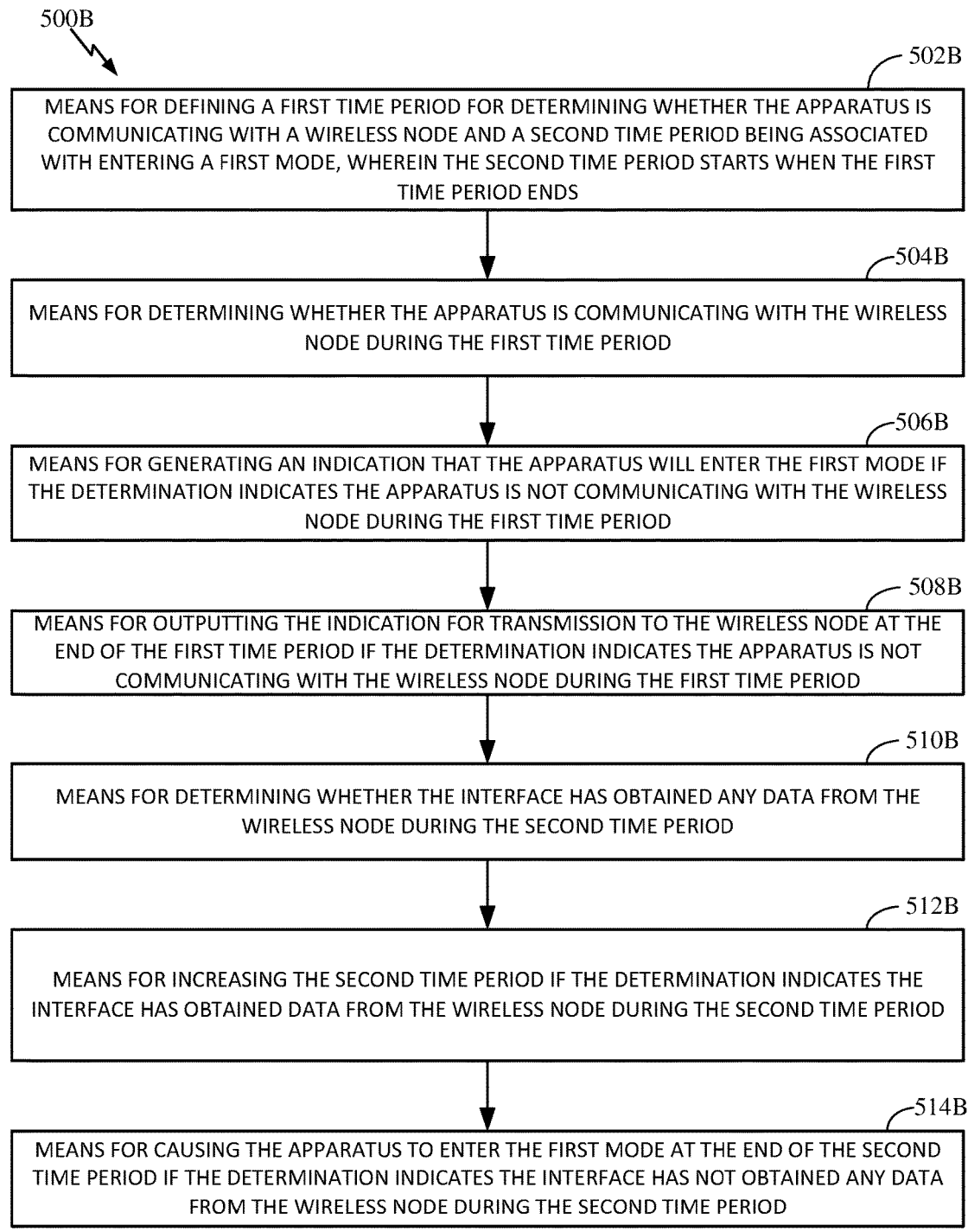
FIG. 5B illustrates example components capable of performing the operations shown in FIG. 5A in accordance with one or more aspects of the present disclosure.

FIG. 5B illustrates example components capable of performing the operations shown in FIG. 5A in accordance with one or more aspects of the present disclosure.

Example of Detection of Rogue AP

Figure 6A:
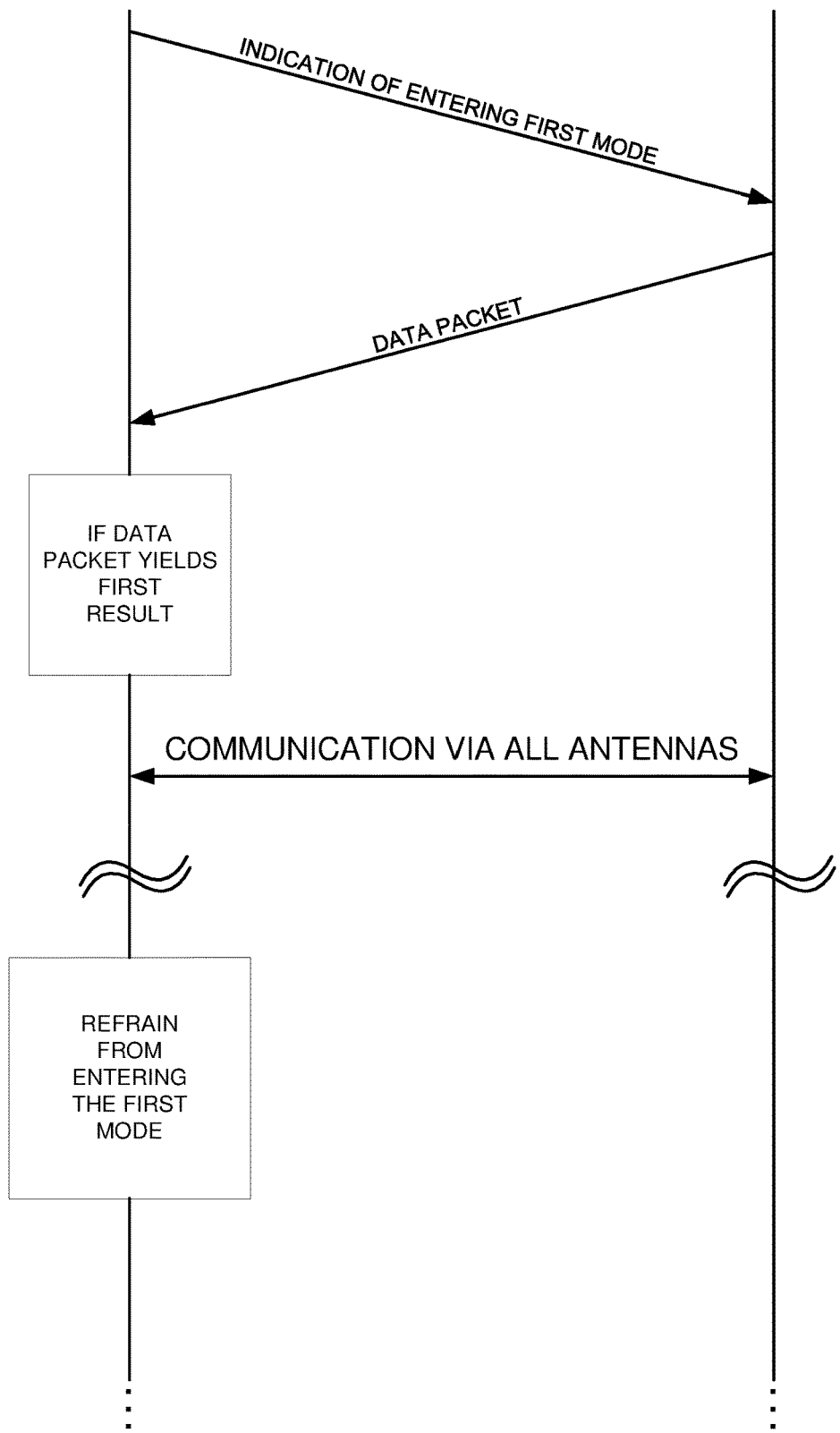
FIG. 6A illustrates one or more aspects regarding a wireless node such as an access terminal (AT) that informs another wireless node such as an access point (AP) about its intention to enter a first mode during which the AT will communicate with the AP by using a subset of a set of its antennas.

FIG. 6A illustrates one or more aspects regarding an access terminal (AT) that informs an access point (AP) about its intention to enter a first mode during which the AT will communicate with the AP by using a subset of a set of its antennas.

For example, the AT has two antennas and can (1) use one antenna for WiFi communications and the other antenna for cellular communications or (2) both antennas for either (i) WiFi communications with the AP or (ii) cellular communications. With respect to FIG. 6A and FIG. 6B, the AT is currently using both antennas for, e.g., WiFi communications and now informing the AP about its intention to only use one antenna to further communicate with the AP by transmitting an indication regarding such intention. In certain aspects, the set has four antennas and the AT can (1) use two antennas for WiFi communications with the AP and the other two antennas for cellular communications or (2) all four antennas for either (i) WiFi communications with the AP or (ii) cellular communications. Assuming the AT is currently communicating with the AP by using all four antennas, the AT can, when needed, inform the AP that it will only use two of the four antennas to further communicate with the AP.

After informing the AP, the AT receives a data packet from the AP. Based on the data packet, the AT then determines either a first result illustrated in FIG. 6A or a second result illustrated in FIG. 6B.

In one aspect, the data packet was not obtained within a time period that follows the transmission of the indication that the AT will enter the first mode and thus, the determination yields the first result. More Specifically, such time period provides a grace period before which the AT could enter the first mode just in case there is incoming data from the AP. In one or more aspects, this time period is equal to or less than 200 ms and, preferably, is equal to or less than 40 ms. Since the AT did not obtain the data packet during such time period, this effectively means that the data packet was obtained after such time period but before the AT entering the first mode. Thus, the AP did not honor the AT's request to use just one antenna for communication with the AP and, instead, has continued to use two antennas to transmit data to the AT via two data streams. Therefore, the AT will then (1) use all its antennas in the set (both antennas) to further communicate with the AP since there might be more incoming data from the AP and, if needed, inform the AP again that it would like to enter the first mode or (2) refrain from entering the first mode as illustrated in FIG. 6A since the AP is or could be a rogue AP.

Figure 6B:
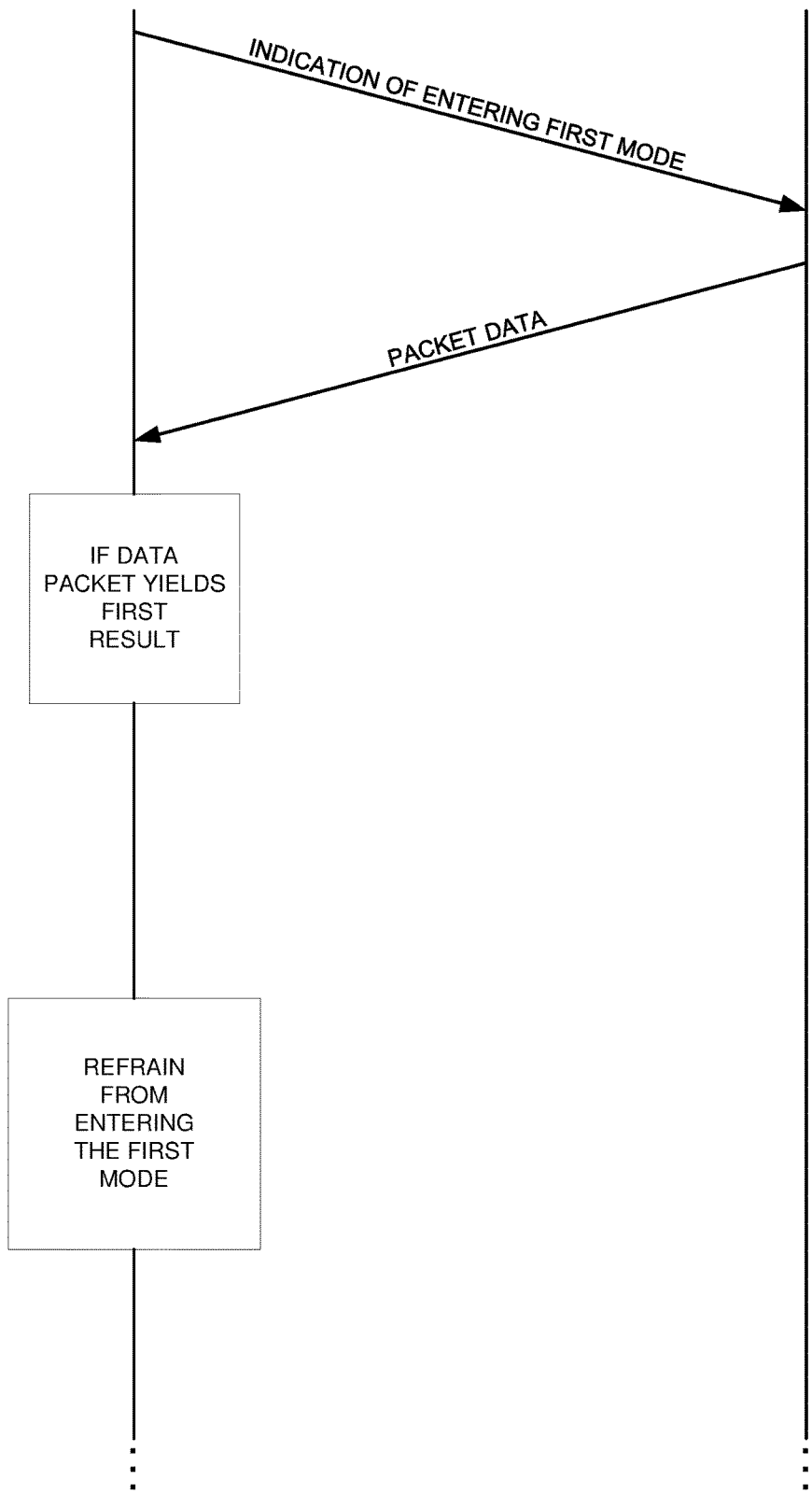
FIG. 6B illustrates one or more aspects regarding the same AT shown in FIG. 6A that determines a second result, instead of the first result, based on the data packet and takes one or more action based on the second result.

In another aspect, the data packet was obtained within such time period that follows the transmission of the indication that the AT will enter the first mode and thus, the determination yields the second result. Although the AT did obtain the data packet by using two antennas prior to entering the first mode, such data packet was obtained during the "grace" time period that accounts for the fact that the transmission of the indication and the transmission of the data packet could cross paths. Therefore, the AT will enter the first mode as illustrated in FIG. 6B.

In certain aspects, the data packet was obtained after the AT had entered and then exited the first mode. The AT then uses the sequence number of the data packet and determines a difference between such sequence number and a sequence number of the previously obtained data packet, which is not illustrated in FIG. 6A and FIG. 6B and was obtained immediately before the data packet illustrated in FIG. 6A and FIG. 6B.

The determination yields the first result if the value of such difference is greater than a threshold value such as the value of the difference between two consecutive data packets. Thus, this indicates that AP is a rogue AP because it must have had transmitted at least one data packet via two data streams to the AT while the AT was in the first mode during which the AT was configured to use only one antenna and thus the AT could not receive any data packet being transmitted via two spatial streams. Accordingly, the AT will then (1) use all its antennas in the set (both antennas) to further communicate with the AP or (2) refrain from entering the first mode as illustrated in FIG. 6A.

The determination yields the second result if the value of such difference is equal to or less than the threshold value. This indicates the AP had gotten the indication from the AT that the AT will enter the first mode, waited for the AT to exit the first mode and transmitted the data packet to the AT. Accordingly, the AT can later re-enter the first mode as illustrated in FIG. 6B.

In additional aspects, the AT can test whether the AP is rogue. More specifically, after being associated with such AP the apparatus generates a request for data from the AP and outputs such request for transmission before generating and outputting the indication of entering the first mode for transmission. After exiting the first mode, the AT should receive the requested data.

If the AT exits the first mode and then obtains data that is different from the requested data, this indicates the first result. The requested data has not been received by the AT because such requested data was transmitted to the AT by the AP while the AT was in the first mode. Therefore, the AT will then (1) use all its antennas in the set (both antennas) to further communicate with the AP or (2) refrain from re-entering the first mode as illustrated in FIG. 6A since the AP is a rouge AP.

If the AT exits the first mode and then obtains or receives the data as requested, this indicates the second result. Accordingly, the AT can re-enter the first mode as illustrated in FIG. 6B.

Figure 7A:
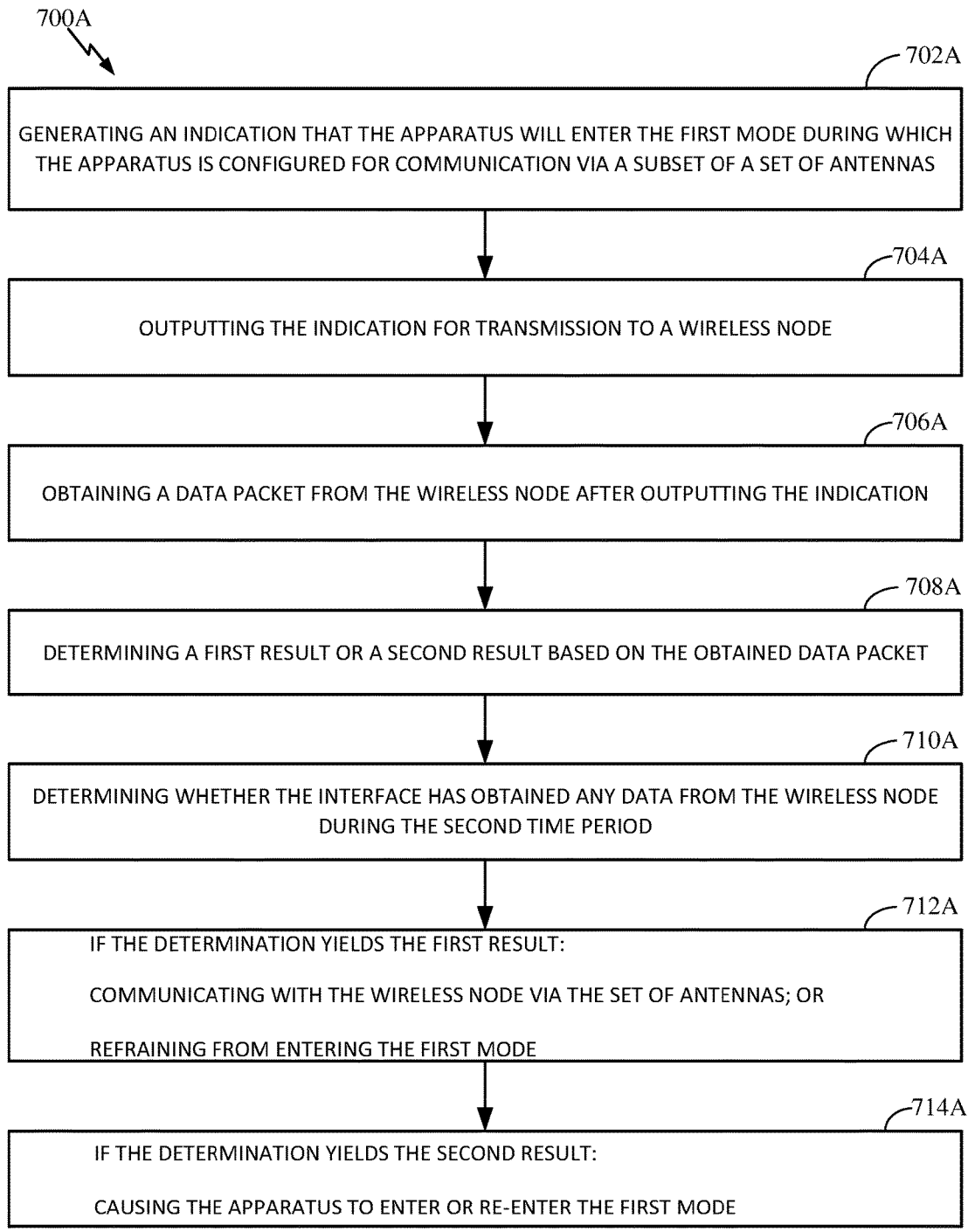
FIG. 7A is a flow diagram of example operations for wireless communications, in accordance with aspects of FIG. 6A and FIG. 6B.

FIG. 7A is a flow diagram of example operations for wireless communications, in accordance with aspects of FIG. 6A and FIG. 6B. The operations 700A may be performed by an apparatus or a wireless device 302 of FIG. 3. In certain aspects, the wireless device 302 is an access point or the STA 120m.

At block 702A, the apparatus generates an indication that the apparatus will enter the first mode during which the apparatus is configured for communications via a subset of a set of antennas. Thereafter, at block 704A, the apparatus outputs such indication for transmission to a wireless node such as an access point. For example, if the set has two antennas, the apparatus would inform the access point that it plans to use one only the two antennas. Note that the set of antennas can also have more than two antennas.

At block 706A, the apparatus obtains a data packet from the wireless node after outputting the indication.

At block 708A, the apparatus determines a first result or a second result based on the obtained data packet. The outcome of this determination depends on when the data packet was obtained or the content of the data packet as discussed above with reference to FIGS. 6A and 6B.

At block 710A, if the determination yields the first result, the apparatus communicates with the wireless node via the set of antennas or refrain from entering the first mode. This refrain can be temporarily or permanent.

At block 712A, if the determination yields the second result, the apparatus causes the apparatus to enter the first mode or re-enter the first mode. For example, the apparatus would re-enter the first mode if the apparatus had previously entered the first mode based on blocks 702A-708A and 712A and then exited such the first mode.

Figure 7B:
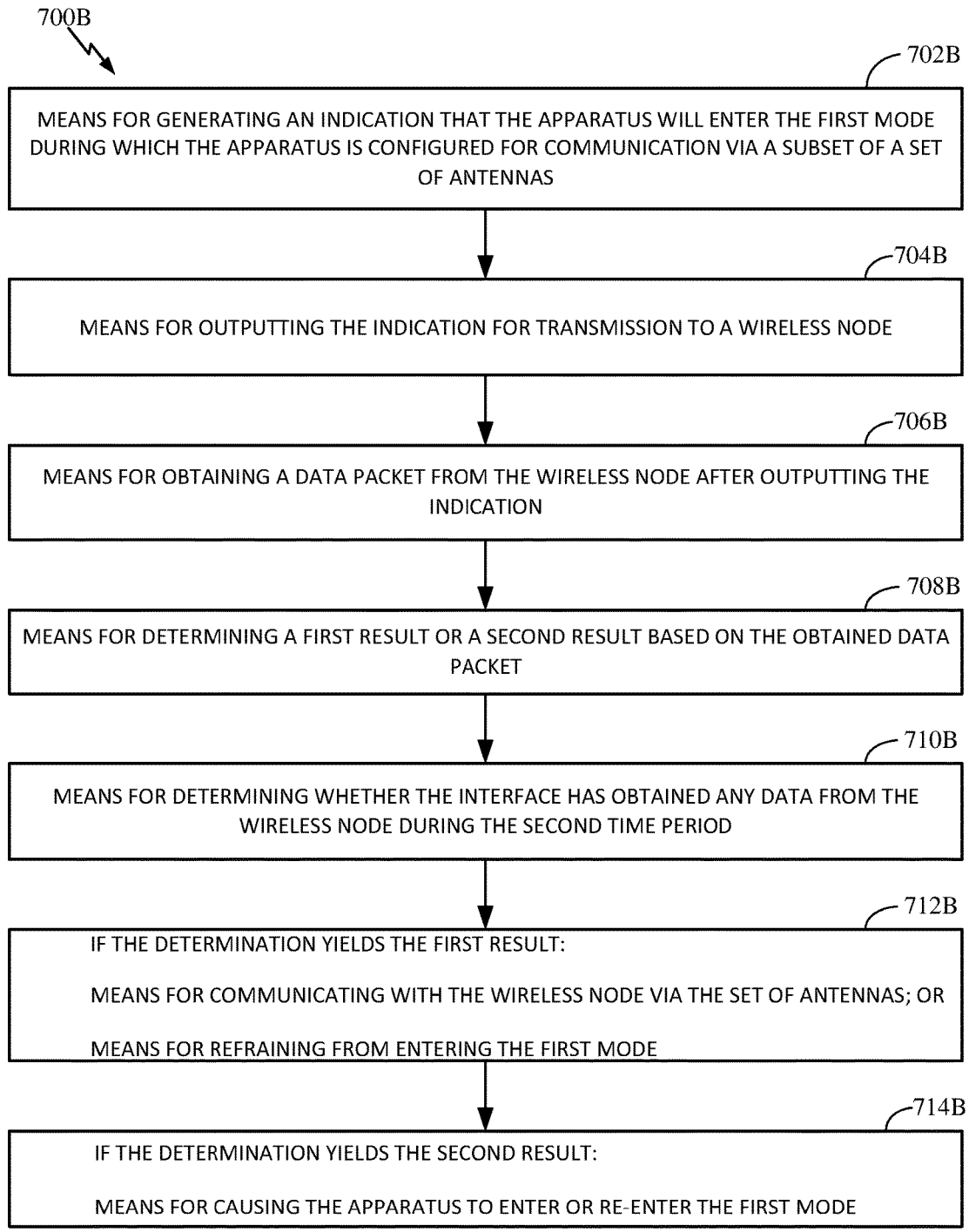
FIG. 7B illustrates example components capable of performing the operations shown in FIG. 7A in accordance with one or more aspects of the present disclosure.

FIG. 7B illustrates example components capable of performing the operations shown in FIG. 7A in accordance with one or more aspects of the present disclosure.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. More specifically, operations 500A illustrated in FIG. 5A correspond to means 500B illustrated in FIG. 5B and operations 700A illustrated in FIG. 7A correspond to means 700B illustrated in FIG. 7B.

For example, means for transmitting (or means for outputting for transmission) may include a transmitter (e.g., the transmitter unit 222) and/or an antenna(s) 224 of the access point 110 or the transmitter unit 254 and/or antenna(s) 252 of the station 120 illustrated in FIG. 2. Means for receiving (or means for obtaining) may include a receiver (e.g., the receiver unit 222) and/or an antenna(s) 224 of the access point 110 or the receiver unit 254 and/or antenna(s) 252 of the station 120 illustrated in FIG. 2. Means for generating, means for determining, means for obtaining, means for communicating, means for refraining, means for causing, means for associating, means for defining or means for increasing may include a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the station 120 illustrated in FIG. 2.

In some cases, rather than actually transmitting a frame, a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall network or system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communications media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may include a single instruction, or many instructions, and may be distributed over several different code segments, among different programs, and across multiple storage media. The computer-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be used.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication comprising:
a processing system configured to:
define a first time period for determining whether the apparatus is communicating with a wireless node and a second time period being associated with entering a first mode, wherein the second time period starts when the first time period ends;
determine whether the apparatus is communicating with the wireless node during the first time period; and
generate an indication that the apparatus will enter the first mode if the determination indicates the apparatus is not communicating with the wireless node during the first time period; and
an interface configured to output the indication for transmission to the wireless node at the end of the first time period if the determination indicates the apparatus is not communicating with the wireless node during the first time period, wherein:
the processing system is further configured to:
determine whether the apparatus has obtained any data from the wireless node during the second time period;
increase the second time period if the determination indicates the apparatus has obtained data from the wireless node during the second time period; and
cause the apparatus to enter the first mode at the end of the second time period if the determination indicates the apparatus has not obtained any data from the wireless node during the second time period.

2. The apparatus of claim 1, wherein the first time period is equal to 40 Milliseconds (ms) and the second time period is equal to or less than 10 ms.

3. The apparatus of claim 1, wherein a sum of the first time period and the increased second time period is one second.

4. The apparatus of claim 1, wherein a sum of the first time period and the increased second time period is four times a sum of the first time period and the second time period.

5. The apparatus of claim 1, wherein the first mode is a sleep mode or a power save mode.

6. The apparatus of claim 1, wherein:
the processing system is further configured to cause the apparatus to exit the first mode;
the interface is further configured to obtain a data packet from the wireless node, said data packet having a sequence number; and
the processing system is further configured to:
determine a difference between the sequence number of the data packet and a sequence number of another data packet previously obtained by the apparatus prior to the indication being generated; and
increase the first time period for subsequent determination of whether the apparatus is communicating with the wireless node if the difference is greater than a threshold value; or
refrain from re-entering the first mode if the difference is greater than a threshold value.

7. The apparatus of claim 1, wherein:
the first mode comprises a power save mode;
the interface is further configured to obtain a data packet from the wireless node; and
the processing system is further configured to:
increase the first time period for subsequent determination of whether the apparatus is communicating with the wireless node; or
refrain from re-entering the power save mode.

8. The apparatus of claim 1, wherein:
the processing system is further configured to:
associate with the wireless node; and
generate a request for first data from the wireless node;
the interface is further configured to output the request for transmission to the wireless node before outputting the indication for transmission to the wireless node;
the processing is further configured to cause the apparatus to exit the first mode;
the interface is further configured to obtain second data from the second apparatus, said second data being different from the requested first data; and the processing system is further configured to:
  increase the first time period for subsequent determination of whether the apparatus is communicating with the wireless node; or
  refrain from re-entering the first mode.
9. The apparatus of claim 1, wherein:
the processing system is further configured to:
  associate with the wireless node; and
  generate a request for first data from the wireless node;
the interface is further configured to:
  output the request for transmission to the wireless node before outputting the indication for transmission to the wireless node; and
the processing system is further configured to:
  cause the apparatus to exit the first mode; and
  increase the first time period for subsequent determination of whether the apparatus is communicating with the wireless node if the requested first data is not received within a time period after exiting the first mode by the apparatus; or
  refrain from re-entering the first mode if the requested first data is not received within a time period after exiting the first mode by the apparatus.
10. A method of wireless communication comprising:
defining a first time period for determining whether the apparatus is communicating with a wireless node and a second time period being associated with entering a first mode, wherein the second time period starts when the first time period ends;
determining whether the apparatus is communicating with the wireless node during the first time period;
generating an indication that the apparatus will enter the first mode if the determination indicates the apparatus is not communicating with the wireless node during the first time period;
outputting the indication for transmission to the wireless node at the end of the first time period if the determination indicates the apparatus is not communicating with the wireless node during the first time period;
determining whether the apparatus has obtained any data from the wireless node during the second time period;
increasing the second time period if the determination indicates the apparatus has obtained data from the wireless node during the second time period; and
causing the apparatus to enter the first mode at the end of the second time period if the determination indicates the apparatus has not obtained any data from the wireless node during the second time period.
11. The method of claim 10, wherein the first time period is equal to 40 ms and the second time period is equal to or less than 10 ms.
12. The method of claim 10, wherein a sum of the first time period and the increased second time period is one second.
13. The method of claim 10, wherein a sum of the first time period and the increased second time period is four times a sum of the first time period and the second time period.
14. The method of claim 10, wherein the first mode is a sleep mode or a power save mode.
15. The method of claim 10 further comprising:
causing the apparatus to exit the first mode;
obtaining a data packet from the wireless node, said data packet having a sequence number;
determining a difference between the sequence number of the data packet and a sequence number of another data packet previously obtained by the apparatus prior to the indication being generated; and
if the difference is greater than a threshold value:
  increasing the first time period for subsequent determination of whether the apparatus is communicating with the wireless node; or
  refraining from re-entering the first mode.
16. The method of claim 10, wherein the first mode comprises a power save mode, and further comprising:
obtaining, during the power save mode, a data packet from the wireless node; and
increasing the first time period for subsequent determination of whether the apparatus is communicating with the wireless node; or
refraining from re-entering the power save mode.
17. The method of claim 10 further comprising:
associating with the wireless node;
generating a request for first data from the wireless node;
outputting the request for transmission to the wireless node before outputting the indication for transmission to the wireless node;
causing the apparatus to exit the first mode;
obtaining second data from the second apparatus, said second data being different from the requested first data; and
increasing the first time period for subsequent determination of whether the apparatus is communicating with the wireless node; or
refraining from re-entering the first mode.
18. The method of claim 10 further comprising:
associating with the wireless node;
generating a request for first data from the wireless node;
outputting the request for transmission to the wireless node before outputting the indication for transmission to the wireless node;
causing the apparatus to exit the first mode; and
if the requested first data is not received within a time period after exiting the first mode by the apparatus:
  increasing the first time period for subsequent determination of whether the apparatus is communicating with the wireless node; or
  refraining from re-entering the first mode.
19. An access terminal comprising:
a processing system configured to:
  define a first time period for determining whether the apparatus is communicating with a wireless node and a second time period being associated with entering a first mode, wherein the second time period starts when the first time period ends;
  determine whether the apparatus is communicating with the wireless node during the first time period; and
  generate an indication that the apparatus will enter the first mode if the determination indicates the apparatus is not communicating with the wireless node during the first time period; and
a transmitter configured to transmit the indication to the wireless node at the end of the first time period if the determination indicates the apparatus is not communicating with the wireless node during the first time period, wherein:
the processing system is further configured to:
  determine whether the apparatus has obtained any data from the wireless node during the second time period;

increase the second time period if the determination indicates the apparatus has obtained data from the wireless node during the second time period; and cause the apparatus to enter the first mode at the end of the second time period if the determination indicates the apparatus has not obtained any data from the wireless node during the second time period.

\* \* \* \* \*